United States Patent
Dufour et al.

(10) Patent No.: US 9,570,243 B2
(45) Date of Patent: Feb. 14, 2017

(54) CARBONACEOUS COMPOSITION FOR SUPERCAPACITOR CELL ELECTRODE, ELECTRODE, PROCESS FOR THE MANUFACTURE THEREOF AND CELL INCORPORATING SAME

(71) Applicant: Hutchinson, Paris (FR)

(72) Inventors: Bruno Dufour, Champagne sur Seine (FR); David Ayme-Perrot, Huningue (FR); Marie Dieudonne, Laguiole (FR); Philippe Sonntag, Avon (FR)

(73) Assignee: Hutchinson, Paris (FR)

( * ) Notice: Subject to any disclaimer, the term of this patent is extended or adjusted under 35 U.S.C. 154(b) by 626 days.

(21) Appl. No.: 13/734,033

(22) Filed: Jan. 4, 2013

(65) Prior Publication Data

US 2013/0176660 A1    Jul. 11, 2013

(30) Foreign Application Priority Data

Jan. 6, 2012 (FR) .................... 12 50171

(51) Int. Cl.
*H01G 11/48*    (2013.01)
*H01G 11/38*    (2013.01)
(Continued)

(52) U.S. Cl.
CPC .............. *H01G 11/48* (2013.01); *H01G 11/38* (2013.01); *H01G 11/86* (2013.01); *Y02E 60/13* (2013.01); *Y02T 10/7022* (2013.01)

(58) Field of Classification Search
CPC ........ H01G 9/155; H01G 11/38; H01G 11/48; H01G 11/86; Y02E 60/13
(Continued)

(56) References Cited

U.S. PATENT DOCUMENTS 6,356,432 B1   3/2002 Danel et al.
7,316,864 B2   1/2008 Nakayama et al.
(Continued)

FOREIGN PATENT DOCUMENTS

EP   1 225 647 A2   7/2002
EP   1 255 261 A1   11/2002
(Continued)

OTHER PUBLICATIONS

Preliminary Search Report for Application No. FR 12 50171 dated Nov. 5, 2012.
(Continued)

*Primary Examiner* — Eric Thomas
*Assistant Examiner* — Arun Ramaswamy
(74) *Attorney, Agent, or Firm* — Alston & Bird LLP

(57) ABSTRACT

A carbonaceous composition usable to constitute a supercapacitor cell electrode, a porous electrode usable to equip such a cell, a process for manufacturing this electrode and one such cell incorporating at least one such electrode, for example in order to equip an electric vehicle. This composition is usable to be in contact with an aqueous ionic electrolyte, is based on a carbonaceous powder and comprises a hydrophilic binder-forming system. The system may include between 3% and 10% by weight a first crosslinked polymer having a number-average molecular weight Mn of greater than 1000 g/mol and having alcohol groups, and between 0.3% and 3% by weight a second polymer of at least one acid and which has a pKa of between 0 and 6 and a number-average molecular weight Mn of greater than 500 g/mol, the first polymer being crosslinked thermally in the presence of the second polymer.

16 Claims, 1 Drawing Sheet

(51) Int. Cl.
*H01G 11/86* (2013.01)
*H01G 9/00* (2006.01)
*H01G 9/02* (2006.01)

(58) Field of Classification Search
USPC .......................................... 361/502; 252/62.2
See application file for complete search history.

(56) References Cited

U.S. PATENT DOCUMENTS

| | | |
|---|---|---|
| 7,811,337 B2 | 10/2010 | Zhong et al. |
| 7,867,291 B2 | 1/2011 | Petrzilek et al. |
| 2002/0080553 A1* | 6/2002 | Pekala .................. H01G 9/042 361/302 |
| 2004/0130038 A1 | 7/2004 | Murakami et al. |
| 2006/0000071 A1 | 1/2006 | Dandekar et al. |
| 2007/0146967 A1 | 6/2007 | Xi et al. |
| 2008/0107966 A1 | 5/2008 | Lin et al. |
| 2009/0110806 A1 | 4/2009 | Cai et al. |
| 2009/0325069 A1 | 12/2009 | Anada et al. |
| 2010/0304270 A1 | 12/2010 | Amin-Sanayei et al. |
| 2011/0140051 A1 | 6/2011 | Sonntag et al. |
| 2011/0176255 A1 | 7/2011 | Sasaki et al. |

FOREIGN PATENT DOCUMENTS

| | | |
|---|---|---|
| EP | 1 791 199 A1 | 5/2007 |
| EP | 2 071 651 A1 | 6/2009 |
| GB | 2 470 190 A | 11/2010 |
| JP | 11-162794 | 6/1999 |
| JP | 2007 042285 A | 2/2007 |
| JP | 2010 123842 A | 6/2010 |
| JP | 2010 171211 A | 8/2010 |
| JP | 2010 171213 A | 8/2010 |
| WO | WO 2009/125094 A2 | 10/2009 |

OTHER PUBLICATIONS

Search Report and Opinion for European Application No. 13 150 139.7 dated Apr. 13, 2012.

\* cited by examiner

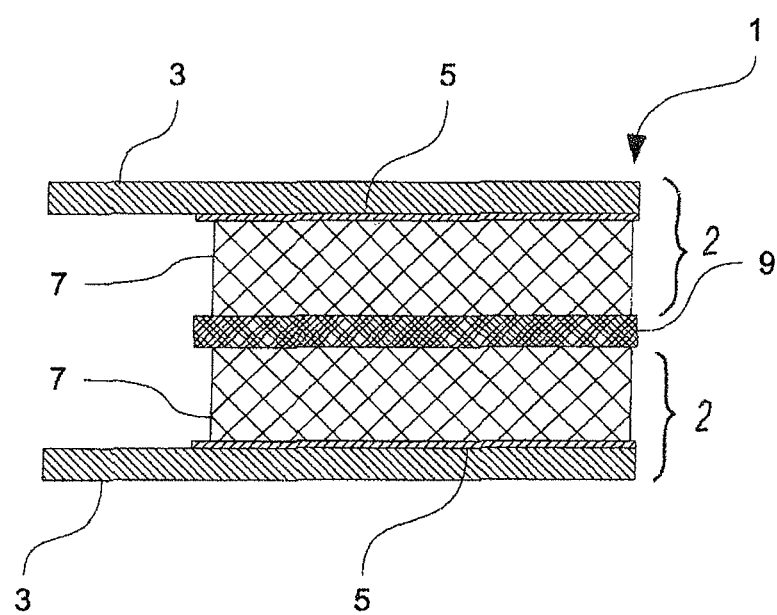

CARBONACEOUS COMPOSITION FOR SUPERCAPACITOR CELL ELECTRODE, ELECTRODE, PROCESS FOR THE MANUFACTURE THEREOF AND CELL INCORPORATING SAME

FIELD

The present invention relates to a carbonaceous composition that is usable to constitute a supercapacitor cell electrode, a porous electrode that is usable to equip one such cell, a process for manufacturing this electrode and one such cell incorporating at least one such electrode. The invention applies in particular, but not exclusively, to supercapacitors suitable for equipping electric vehicles.

BACKGROUND

Supercapacitors are electrical energy storage systems that are particularly advantageous for applications that require electrical energy to be conveyed at high power. Their aptitude for rapid charging and decharging, their increased service life compared to a high-power battery make them promising candidates for many applications. Supercapacitors generally consist of the combination of two conductive porous electrodes having a high specific surface area, submerged in an ionic electrolyte and separated by an insulating membrane known as a "separator", which enables ionic conductivity and prevents electrical contact between the electrodes. Each electrode is in contact with a metallic collector that enables the exchange of the electric current with an outside system. Under the influence of a potential difference applied between the two electrodes, the ions present within the electrolyte are attracted by the electrode surface having an opposite charge, thus forming an electrochemical double layer at the interface of each electrode. The electrical energy is thus stored electrostatically by charge separation. The expression of the capacitance C of a supercapacitor is identical to that of a conventional capacitor, namely:

$C = \epsilon \cdot S / e$, where $\epsilon$ denotes the permittivity of the medium, S the surface area occupied by the double layer, and e the thickness of the double layer.

The capacitances that can be achieved within supercapacitors are nevertheless much higher than those commonly achieved by conventional capacitors, due to the use of carbonaceous electrodes having a maximized specific surface area and the extreme thinness of the electrochemical double layer (typically a few nanometers thick). These carbonaceous electrodes must inevitably be conductive in order to ensure the transport of the electrical charges, porous in order to ensure the transport of the ionic charges and the formation of the electrical double layer over a large surface area, and chemically inert in order to prevent any unwanted energy-consuming reaction.

The energy E stored within a supercapacitor is defined according to the conventional expression for capacitors, namely:

$E = \frac{1}{2} CV^2$, where V is the potential of the supercapacitance.

The capacitance and the potential are therefore two essential parameters that it is necessary to optimize to promote energetic performances. The capacitance depends on the porous texture actually accessible by the electrolyte. However, for applications in transport and especially for an electric vehicle, it is necessary to have a high energy density in order to limit the onboard mass of the supercapacitor, which makes it necessary to have a high mass capacitance.

The potential of a supercapacitor mainly depends on the nature of the electrolyte used and especially on its electrochemical stability, it being specified that there are two major families of electrolytes which are organic and aqueous electrolytes.

Organic electrolytes are based on an organic salt (typically a quaternary ammonium salt) dispersed in an organic solvent. Although certain organic electrolytes make it possible to achieve an operating potential of 2.7 V, organic electrolytes have the drawback of being expensive, inflammable, toxic and potentially polluting, thus posing safety problems for use in a vehicle.

Aqueous electrolytes are on the contrary inexpensive and nonflammable, which renders them attractive for certain applications. The potential that can be applied with these electrolytes is limited to the water stability range, of the order of 1.2 V. Among the aqueous electrolytes that can be used in a supercapacitor, mention may, for example, be made of aqueous solutions of sulfuric acid, of potassium chloride, of potassium sulfate or of other salts in an acid, basic or neutral medium.

In order to be able to achieve operation with high powers, the resistance to the passage of the current in the system must be very low. Indeed, this resistance, which is the sum of the resistances of the various components of the system and especially the resistance of the electrolyte, and that of the current collectors, generates losses by the Joule effect which reduce the efficiency of the supercapacitor. An important contribution is the resistance of the interface between the metallic current collector and the carbonaceous active material of the electrode, which is dependent on the quality and on the nature of the contact. It is therefore necessary to use an electrode that has a good adhesion with the metals used for the collectors in order to improve the electrical contact.

There are currently several techniques for the preparation and implementation of electrodes based on carbon powder for supercapacitors operating with an aqueous ionic electrolyte.

A first technique for example described in documents US-A1-2007/0146967, U.S. Pat. No. B2-7,811,337, EP-A1-1 255 261, US-A1-2006/0000071, U.S. Pat. No. B2-7,316,864, US-A1-2011/0176255 and US-A1-2009/0110806, consists in dispersing the carbon powder with a hydrophobic binder in a solvent or organic monomer, in coating the composition onto a current collector then in evaporating this solvent or in polymerizing this monomer. A typical example of a hydrophobic binder used is poly(vinyl difluoride) (PVDF) used in N-methyl-2-pyrrolidinone (NMP). This technique has the drawback of using toxic products and of releasing volatile organic compounds (VOCs). Furthermore, since the binder cannot be swollen by the aqueous electrolyte, it is necessary to have a large macroporosity of the electrode in order to enable the diffusion of this electrolyte into the electrode, which mechanically weakens the electrode and does not make it possible to have a maximum capacitance.

Another technique consists in using a hydrophobic binder, such as a latex in water. This technique, for example described in documents U.S. Pat. No. B1-6,356,432, US-A1-2010/0304270 or JP-A 1-11-162794 makes it possible to avoid the release of organic solvent but does not enable an optimum exchange in diffusion of the electrolyte in the electrode, which does not lead to an optimum capacitance for the electrode.

Document US-A1-2009/0325069 presents another technique which consists in utilizing hydrophilic binder systems used in an aqueous medium, but the only electrolyte tested in this document in connection with the electrodes manufactured by means of this system is an organic electrolyte (see paragraph [0180]) consisting of ethylammonium tetrafluoroborate dissolved in propylene carbonate. The binder systems tested in this document are based on a propylene/ethylene or propylene/butene/ethylene copolymer modified by maleic anhydride, and additionally comprise N,N-dimethylethanolamine (DMEA) or triethylamine (TEA) as basic compound. These systems are prepared using an organic solvent consisting of n-propanol or tetrahydrofuran, and optionally comprise a reactive surfactant.

A major drawback of such a hydrophilic binder system lies in the dissolving thereof in the water of a specifically aqueous electrolyte.

SUMMARY

One objective of the present invention is to propose a composition based on a carbonaceous powder capable of storing and releasing electrical energy which is usable to constitute an electrode for a supercapacitor cell in contact with an aqueous ionic electrolyte, which composition makes it possible to overcome all of the aforementioned drawbacks while providing good adhesion of the electrode deposited on a metallic current collector and without penalizing the mechanical properties of the electrode after filling with the aqueous electrolyte by avoiding any re-dissolving of the binder-forming system and any cracking of the electrode due to a poorly controlled swelling of this system after filling of the cell with this electrolyte.

This objective is achieved in that the applicant has just discovered, surprisingly, that the combination, according to a weight fraction in the composition of between 3% and 10%, of at least one first polymer having a number-average molecular weight Mn of greater than 1000 g/mol and comprising alcohol groups and, according to a weight fraction in the composition of between 0.3% and 3%, of at least one second polymer of at least one acid and which has a pKa of between 0 and 6 and a molecular weight Mn of greater than 500 g/mol, makes it possible to obtain a hydrophilic binder-forming system for this composition in which said at least one first polymer is crosslinked thermally in the presence of said at least one second polymer after dispersion of the carbonaceous powder and of the system in water, coating of the dispersion obtained onto the collector and then evaporation of the water.

BRIEF DESCRIPTION OF THE DRAWINGS

FIG. 1 shows a schematic representation of the structure of a capacitor.

DETAILED DESCRIPTION

It will be noted that the electrode based on the composition of the invention (which composition thus constitutes a final product directly usable after this crosslinking to constitute this electrode) does not crack after filling of the cell with the aqueous ionic electrolyte, for example based on sulfuric acid, and that the binder-forming system of the invention makes it possible not only to prepare the composition exclusively in water which avoids the use of potentially toxic organic solvents and the release of volatile organic compounds, but also to improve the specific capacitance of the electrode in an acid medium.

With reference to FIG. 1, a schematic representation of the structure of a supercapacitor 1 is shown. The supercapacitor 1 comprises two conductive electrodes 2 immersed in an ionic electrolyte (not represented) and separated by an insulating membrane referred to as a separator 9, which permits ionic conductivity and prevents electrical contact between the electrodes 2. Each electrode 2 comprises a metallic current collector 3 covered with a protective conductive layer 5 and also a monolithic active material 7 in contact with the separator 9.

Preferably, said at least one first polymer has a number-average molecular weight Mn of greater than 10 000 g/mol and is a polymer of an at least partially hydrolyzed ester of polyvinyl acetate) type.

More preferably still, said first polymer(s) is (are) selected from the group consisting of polyvinyl alcohols (PVAs), poly(hydroxyethyl acrylate)s, poly(hydroxyethyl methacrylate)s and mixtures thereof.

Advantageously, said first polymer(s) may be present in the composition according to a weight fraction of between 4% and 8%.

Also preferably, said acid(s) is (are) selected from the group consisting of carboxylic acids, sulfonic acids, phosphonic acids and mixtures thereof, said at least one second polymer having a pKa of between 2 and 5 and a number-average molecular weight Mn of greater than 2000 g/mol.

More preferably still, said second polymer(s) is (are) selected from the group consisting of poly(acrylic acid)s, poly(methacrylic acid)s, poly(styrene-sulfonic acid)s, poly(2-acrylamido-2-methyl-1-propane-sulfonic acid)s, ethylene/maleic acid copolymers, styrene/maleic acid copolymers, styrene-sulfonic acid/maleic acid copolymers, poly(hydroxybutyric acid)s, poly(vinyl-sulfonic acid)s, poly(vinyl-phosphonic acid)s and mixtures thereof.

Advantageously, said second polymer(s) may be present in the composition according to a weight fraction of between 0.4% and 2%.

According to one particularly advantageous exemplary embodiment of the invention, said binder-forming system comprises, in combination, a polyvinyl alcohol as first polymer and a poly(acrylic acid) as second polymer.

Advantageously, said binder-forming system may additionally comprise a cellulose derivative having a number-average molecular weight Mn of greater than 10 000 g/mol and/or a salt of alginic acid, which is (are) present in the composition according to a weight fraction of between 0.1% and 1%, preferably of between 0.2% and 0.5%.

According to the invention, said binder-forming system may for example comprise carboxymethyl cellulose as cellulose derivative and/or a sodium alginate as salt of alginic acid.

The carbonaceous powder of the composition according to the invention may advantageously comprise:

- according to a weight fraction in the composition of between 80% and 86%, at least one milled carbon having a specific surface area greater than or equal to 100 $m^2/g$ and preferably between 200 and 2000 $m^2/g$, and
- according to a weight fraction in the composition of between 10% and 11%, at least one carbon black having a specific surface area less than or equal to 100 $m^2/g$ for example of the "Super-PLi" name or active carbon in another form such as for example in the form of carbon nanotubes and/or graphite, in order to improve the electrical conductivity of the carbonaceous powder.

A porous electrode according to the invention is usable to equip a supercapacitor cell by being submerged in an aqueous ionic electrolyte, and this electrode consists of a composition as defined above which covers a metallic current collector equipping the electrode, which electrode has a thickness preferably of between 200 µm and 400 µm.

A process according to the invention for manufacturing such an electrode essentially comprises:
 a) a dispersion in water of said carbonaceous powder and of said binder-forming system which comprises said at least one first uncrosslinked polymer and said at least one second polymer,
 b) coating of the dispersion obtained onto a metal sheet forming said collector,
 c) evaporation of the water contained in this dispersion, preferably at a temperature between 35° C. and 45° C., then
 d) thermal crosslinking of said of at least one first polymer which is catalyzed by said at least one second polymer and which is preferably carried out at a temperature between 130° C. and 150° C.

Advantageously, the weight content of solid material in the dispersion of step a) may be between 35% and 45%, and use may be made, for this dispersion, of a polyvinyl alcohol as first polymer and a poly(acrylic acid) as second polymer.

Also advantageously, it is additionally possible to disperse in water in step a) a cellulose derivative having a number-average molecular weight Mn of greater than 10 000 g/mol, preferably carboxymethyl cellulose, and/or a salt of alginic acid, preferably a sodium alginate, this cellulose derivative and/or this salt also being crosslinked thermally in step d) in the presence of said at least one second polymer.

A supercapacitor cell according to the invention comprises at least two top and bottom porous electrodes, an electrically insulating membrane separating these electrodes from one another and an ionic electrolyte in which these electrodes are submerged, the cell comprising at least two top and bottom current collectors respectively covered with these top and bottom electrodes, at least one of these electrodes being as defined above in reference to the present invention.

According to one preferred embodiment of the invention, this electrolyte is based on at least one acid or salt in an aqueous medium, for example sulfuric acid.

Other features, advantages and details of the present invention will emerge on reading the following description of several exemplary embodiments of the invention, given by way of illustration and non-limitingly.

Examples 1-4 for Preparation in an Aqueous Medium and for Implementation of a Carbonaceous Electrode Composition According to the Invention Carbon powder referred to as "C1" carbon powder was obtained by milling in a ball mill for 3 minutes at 500 rpm, starting from a piece prepared according to the method described in document WO-A1-2009/125094 in the name of the applicant.

Various mixtures in water were then prepared using a ball mill according to the following compositions, starting from "Super PLi" carbon black (Timcal), a "Mowiol 18-88" polyvinyl alcohol (PVA), a polyacrylic acid (PAA), and carboxymethyl cellulose (CMC). 0.05% by weight of a "Byk 24" defoamer was added. The PAA makes it possible to catalyze the crosslinking of the PVA and of the CMC by dehydration.

TABLE 1

Formulations of these compositions for the preparation of electrodes in an aqueous medium (weight fractions):

|  | Example 1 | Example 2 | Example 3 | Example 4 |
|---|---|---|---|---|
| Carbon C1 | 84.2% | 84.5% | 81.9% | 81.9% |
| Carbon black Super PLi | 10.5% | 10.6% | 10.2% | 10.2% |
| PVA | 4.5% | 4.5% | 7.2% | 6.4% |
| PAA | 0.5% | 0.45% | 0.7% | 1.5% |
| CMC | 0.3% |  |  |  |
| Solid content | 40% | 40% | 40% | 40% |

The dispersions obtained with these compositions were then coated onto a sheet of stainless steel having a thickness of 20 µm using a doctor blade having a well-defined opening. After evaporation of the water at 40° C., a dry thickness of around 300 µm was obtained for each electrode. These electrodes were then crosslinked at 140° C. for 30 minutes.

Comparative Examples 1-2 not in Accordance with the Invention

The following two compositions were prepared under similar conditions to those of Examples 1-4.

TABLE 2

Formulations of these compositions for the preparation of electrodes in an aqueous medium (weight fractions):

|  | Comparative example 1 | Comparative example 2 |
|---|---|---|
| Carbon C1 | 80% | 80% |
| Carbon black Super PLi | 10% | 10% |
| PVA | 10% | 10% |
| Citric acid | 0.2% |  |
| $H_2SO_4$ 1M |  | 0.2% |
| Solid content | 33% | 43% |

The compositions obtained were used, via coating, evaporation and then crosslinking, under similar conditions to those of Examples 1-4, except that in these comparative examples the crosslinking of PVA is not catalyzed by PAA but by citric acid or by sulfuric acid depending on the case.

Comparative Examples 3-5 not in Accordance with the Invention

The following three compositions were prepared under similar conditions to those of Examples 1-4.

TABLE 3

Formulations of these compositions for the preparation of electrodes in an aqueous medium (weight fractions):

|  | Comparative example 3 | Comparative example 4 | Comparative example 5 |
|---|---|---|---|
| Carbon C1 | 81.1% | 85.1% | 80% |
| Carbon black Super PLi | 10.1% | 10.5% | 10% |
| PAA | 8.8% |  |  |
| CMC |  | 4.3% |  |
| Citric acid |  | 0.1% |  |
| HEC (hydroxyethyl cellulose) |  |  | 10% |
| Solid content | 20% | 20% | 35% |

The compositions obtained were used, via coating, evaporation and then crosslinking, under similar conditions to those of Examples 1-4.

Comparative Example 6 not in Accordance with the Invention

The following composition was prepared under similar conditions to those of Examples 1-4, but by using, as binder, poly(vinyl difluoride) (PVDF) in an organic solvent, N-methylpyrrolidinone (NMP).

TABLE 4

Formulation of this composition for the preparation of an electrode in an organic solvent (weight fractions):

|  | Comparative example 6 |
|---|---|
| Carbon C1 | 80% |
| Carbon black Super PLi | 10% |
| PVDF | 10% |
| Solid content | 40% |

The dispersions obtained with these compositions were then coated onto a sheet of stainless steel having a thickness of 20 μm using a doctor blade having a well-defined opening. After evaporation of the NMP at 60° C., a dry electrode thickness of around 300 μm was obtained.

Performances Obtained for the Electrodes According to Examples 1-4 of the Invention and the Comparative Examples 1-6

The capacitance of the electrodes was characterized electrochemically. Their mechanical (crack) strength was evaluated once these electrodes were filled with aqueous electrolyte, then after electrochemical cycling. The device tested and the electrochemical tests used were the following.

Two identical electrodes insulated by a separator were placed in series within a supercapacitor measurement cell containing the aqueous electrolyte based on sulfuric acid (1M H2SO4) and controlled by a "Bio-Logic VMP3" potentiostat/galvanostat via a three-electrode interface. A first electrode corresponded to the working electrode and the second electrode constituted both the counter electrode and the reference electrode.

Measurement of the Average Specific Capacitance:

The device was subjected to charge-discharge cycles at a constant current I of 0.2 A/g of the working electrode.

Since the potential changes linearly with the charge conveyed, the capacitance C of the supercapacitive system was deduced from the slopes p during charging and discharging (knowing that C=I/p). Since the system is symmetrical in terms of masses (m1=m2=m), the average specific capacitance Cspe was defined by: Cspe=2×C/m.

Charge-Discharge Cycles:

The cell is subjected to 1000 charge-discharge cycles at a constant current of 1 A/g of the working electrode.

The performances of the various electrodes are illustrated in the following table, it being specified that the adhesion and mechanical strength tests, which used a collector made of stainless steel constituted of the aforementioned sheet, give an account of the results obtained in a relative manner via + symbols and − symbols (i.e. adhesion and strength respectively satisfactory and deficient).

TABLE 5

Performances of the electrodes in 1M $H_2SO_4$:

| Property | Ex 1 | Ex 2 | Ex 3 | Ex 4 | Ex C1 | Ex C2 | Ex C3 | Ex C4 | Ex C5 | Ex C6 |
|---|---|---|---|---|---|---|---|---|---|---|
| Specific capacitance (F/g) | 85 | 79 | 76 | 69 | 69 | 65 | 50 | 56 | Not measurable | 49 |
| Cracking after filling | No | No | No | No | No | Yes | Yes | No | Yes | No |
| Adhesion to the collector after filling | + | + | + | + | − | − | − | − | − | − |
| Strength after 1000 charge/discharge cycles | + | + | + | + | + | + | − | − | Not measurable | + |

As can be seen in this Table 5, the optimum capacitive performances are observed for electrodes according to the invention used in water (Examples 1 to 4) with a binder-forming system comprising polyvinyl alcohol and optionally, in addition, carboxymethyl cellulose (see the preferred Example 1 with the maximum capacitance) which is crosslinked in the presence of polyacrylic acid. Indeed, the electrodes obtained according to these four examples of the invention have a specific capacitance greater than or equal to 69 F/g, advantageously greater than 75 F/g and more advantageously still equal to 85 F/g.

Furthermore, these four electrodes according to the invention exhibit good adhesion to the metallic collector made of stainless steel and make it possible to control the swelling of the hydrophilic binder system in the presence of the aqueous electrolyte. Thus, no cracking of the electrodes according to the invention after filling and cycling was observed in the slightest.

This Table 5 also shows that for the electrode of the comparative example 1, a crosslinking of polyvinyl alcohol in the presence of an acid of low molecular weight and of similar pKa (i.e. citric acid) did not make it possible to obtain a good adhesion of this electrode to the collector after filling with the aqueous electrolyte based on sulfuric acid.

This Table 5 also shows that for the electrode of comparative example 2, a crosslinking catalyzed by an acid having a lower pKa (i.e. 1M H2SO4) did not make it possible to prevent the cracking of this electrode after filling.

It will also be noted that the other binders tested in Comparative examples 3 to 5 give the corresponding electrodes lower capacitances and a reduced mechanical strength in the aqueous electrolyte used.

It will finally be noted that the use of a hydrophobic binder, such as PVDF, does not make it possible to obtain a high specific capacitance for the electrode incorporating it (see Comparative example 6).

The invention claimed is:

1. Carbonaceous composition usable to constitute a supercapacitor electrode in contact with an aqueous ionic electrolyte, the composition being based on a carbonaceous powder capable of storing and releasing electrical energy and comprising a hydrophilic binder-forming system, wherein said system comprises:
   according to a weight fraction in the composition of between 3% and 10%, at least one first crosslinked polymer having a number-average molecular weight Mn of greater than 1000 g/mol and comprising alcohol groups, and
   according to a weight fraction in the composition of between 0.3% and 3%, at least one second polymer of at least one acid and which has a pKa of between 0 and 6 and a number-average molecular weight Mn of greater than 500 g/mol,
said at least one first polymer being crosslinked thermally in the presence of said at least one second polymer.

2. Composition according to claim 1, wherein said at least one first polymer has a number-average molecular weight Mn of greater than 10 000 g/mol and is a polymer of an at least partially hydrolyzed ester of poly(vinyl acetate) type.

3. Composition according to claim 1, wherein said first polymer(s) is (are) selected from the group consisting of polyvinyl alcohols (PVAs), poly(hydroxyethyl acrylate)s, poly(hydroxyethyl methacrylate)s and mixtures thereof.

4. Composition according to claim 1, wherein said first polymer(s) is (are) present in the composition according to a weight fraction of between 4% and 8%.

5. Composition according to claim 1, wherein said acid(s) is (are) selected from the group consisting of carboxylic acids, sulfonic acids, phosphonic acids and mixtures thereof, said at least one second polymer having a pKa of between 2 and 5 and a number-average molecular weight Mn of greater than 2000 g/mol.

6. Composition according to claim 5, wherein said second polymer(s) is (are) selected from the group consisting of poly(acrylic acid)s, poly(methacrylic acid)s, poly(styrene-sulfonic acid)s, poly(2-acrylamido-2-methyl-1-propane-sulfonic acid)s, ethylene/maleic acid copolymers, styrene/maleic acid copolymers, styrene-sulfonic acid/maleic acid copolymers, poly(hydroxybutyric acid)s, poly(vinyl-sulfonic acid)s, poly(vinyl-phosphonic acid)s and mixtures thereof.

7. Composition according to claim 1, wherein said second polymer(s) is (are) present in the composition according to a weight fraction of between 0.4% and 2%.

8. Composition according to claim 1, wherein said binder-forming system comprises, in combination, a polyvinyl alcohol as first polymer and a poly(acrylic acid) as second polymer.

9. Composition according to claim 1, wherein said binder-forming system additionally comprises a cellulose derivative having a number-average molecular weight Mn of greater than 10 000 g/mol and/or a salt of alginic acid, which is (are) present in the composition according to a weight fraction of between 0.1% and 1%.

10. Composition according to claim 1, wherein said binder-forming system additionally comprises a cellulose derivative having a number-average molecular weight Mn of greater than 10 000 g/mol and/or a salt of alginic acid, which is (are) present in the composition according to a weight fraction of between 0.2% and 0.5%.

11. Composition according to claim 10, wherein said binder-forming system comprises carboxymethyl cellulose as cellulose derivative and/or a sodium alginate as salt of alginic acid.

12. Composition according to claim 1, wherein said carbonaceous powder comprises:
   according to a weight fraction in the composition of between 80% and 86%, at least one milled carbon having a specific surface area greater than or equal to 100 $m^2/g$, and
   according to a weight fraction in the composition of between 10% and 11%, at least one carbon black having a specific surface area less than or equal to 100 $m^2/g$ for example of the "Super-PLi" name or active carbon in another form, in order to improve the electrical conductivity of the carbonaceous powder.

13. Composition according to claim 12, wherein said at least one milled carbon has a specific surface area between 200 and 2000 $m^2/g$.

14. Porous electrode usable to equip a supercapacitor cell by being submerged in an aqueous ionic electrolyte, wherein the electrode consists of a composition according to claim 1 and covers a metallic current collector equipping the electrode, which electrode has a thickness of between 200 μm and 400 μm.

15. Supercapacitor cell comprising at least two top and bottom porous electrodes, an electrically insulating membrane separating these electrodes from one another and an ionic electrolyte in which these electrodes are submerged, the cell comprising at least two top and bottom current collectors respectively covered with these top and bottom electrodes, wherein the at least one of these electrodes is as defined in claim 14.

16. Cell according to claim 15, wherein said electrolyte is based on at least one acid or salt in an aqueous medium, for example sulfuric acid.

* * * * *